United States Patent
Kamel et al.

(10) Patent No.: US 6,381,235 B1
(45) Date of Patent: Apr. 30, 2002

(54) WIRELESS CDMA SYSTEM HAVING A UNIQUE FORWARD CONFIGURATION CONTROL CHANNEL

(75) Inventors: Raafat E. Kamel, Westfield; Yuen-Yin L. Koo, Morristown; Wen-Yi Kuo, Parsippany; Semyon B. Mizikovsky, Morganville, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/086,485

(22) Filed: May 29, 1998

(51) Int. Cl.$^7$ ................................................. H04B 7/216
(52) U.S. Cl. ........................ 370/342; 370/320; 370/335
(58) Field of Search ................................. 370/342, 335, 370/320, 208, 209, 441, 479, 524

(56) References Cited

U.S. PATENT DOCUMENTS

| | | | |
|---|---|---|---|
| 5,267,261 A | * 11/1993 | Blakeney, II et al. | ........... 375/1 |
| 5,640,414 A | 6/1997 | Blakeney, II et al. | |
| 5,878,038 A | * 3/1999 | Willey | ........................ 370/335 |
| 5,926,470 A | * 7/1999 | Tiedemann, Jr. | ............ 370/334 |

FOREIGN PATENT DOCUMENTS

| | | |
|---|---|---|
| EP | 0652680 | 5/1995 |
| EP | 0899981 | 3/1999 |
| EP | 0928119 | 7/1999 |
| EP | 0930798 | 7/1999 |
| WO | WO9528810 | 10/1995 |
| WO | WO9628912 | 9/1996 |

OTHER PUBLICATIONS

V. K. Varma et al., "Integrated Alerting and System Broadcast Channel for a Wireless Access System", IEEE Transactions on Vehicular Technology vol. 45, No. 1, Feb. 1, 1996, pp. 157–163.

* cited by examiner

Primary Examiner—Dang Ton
Assistant Examiner—Toan Nguyen
(74) Attorney, Agent, or Firm—Birch Stewart Kolasch & Birch

(57) ABSTRACT

The wireless CDMA system includes a base station which generates a configuration channel as one of the forward control channels. The message slots in the configuration channel only include overhead messages. The base station also generates at least one other forward control channel, but these other forward control channels do not need to include overhead messages in any of their message slots. The mobiles in the system determine the location of the configuration channel from information in a sync channel generated by the base station. By camping onto the configuration channel, a mobile can quickly obtain the overhead parameters in the overhead messages. Because obtaining overhead parameters and keeping an updated version of the overhead parameters is an important factor in overall performance, the significant decrease in overhead message access time provided by the provision of the configuration channel greatly improves performance.

35 Claims, 8 Drawing Sheets

WIRELESS CDMA SYSTEM HAVING A UNIQUE FORWARD CONFIGURATION CONTROL CHANNEL

BACKGROUND OF THE INVENTION

1. Field of the Invention

The present invention relates to a wireless CDMA system, and more particularly, a wireless CDMA system having a unique forward control channel dedicated for transmission of system overhead information.

2. Description of Related Art

Conventional CDMA systems employ a plurality of channels on a single CDMA carrier. The system differentiates between the channels by assigning a different Walsh code to each channel. Specifically, each base station in the system transmits a reference signal called a pilot channel having a Walsh code of 0. The pilot channel generated by one base station for a particular CDMA carrier generally is the same as the pilot channel generated by another base station for the same CDMA carrier except for being shifted in time. The other channels associated with a pilot channel have the same time shift, but different Walsh codes from the pilot channel.

For instance in one CDMA standard, a sync channel is Walsh code 32. Having detected the strongest pilot channel, a mobile (e.g., a cellular phone) accesses the associated sync channel using the Walsh code 32. The sync channel includes information on the base station and communication capabilities thereof such as a pilot offset index, a long code state, a system time, etc.

The pilot offset index indicates the time shift of the pilot channel generated by the base station. The long code indicates the state of the long code for accessing a forward control channel at the time given by the system time. Forward control channels having the format shown in FIG. 1 are traditionally referred to as paging channels, and will be referred to as such in this description. Using the long code state, the mobile accesses the first of a possible plurality of paging channels referred to as the primary paging channel.

As shown in FIG. 1, each paging channel is divided into a plurality of slots. Overhead message slots 10 alternate with mobile specific message slots 12. Mobile specific message slots 12 generally include a message for a particular mobile communicating with the base station. An overhead message slot 10 includes overhead messages for all mobiles communicating with the base station. Because the base station can only service a finite number of mobiles using one paging channel, a base station may employ more than one paging channel.

Besides the pilot channel, sync channel, and paging channel(s) discussed above, the typical wireless CDMA system further includes a plurality of traffic channels and an access channel. It is over the access channel that mobiles send messages to the base station when the mobile is not on a traffic channel, and it is on a traffic channel that communication between the mobile and base station takes place. For example, via the access channel, the mobile will request that the base station assign a traffic channel for the mobile to use in making a call.

The overhead messages in the overhead message slots 10 of each paging channel generally include at least the following messages: a system parameters message, a neighbor list message, a channel list message, and an access parameters message. It should be understood, that generic names have been given to each of these messages, and that the particular name is not intended to reference a particular CDMA standard. Instead, each message is intended to cover the message or messages in a particular CDMA standard that meet the definition given below for each message. Furthermore, each message will only be described to the extent needed to better understand the present invention.

The system parameters message informs a mobile of what parameters to use in tasks such as pilot channel searching, hand-off, power control, etc. For example, the hand-off parameter gives a signal level threshold which a mobile uses in deciding whether to switch base stations. Namely, if a detected pilot channel of a base station not currently servicing the communication needs of a mobile exceeds the signal level threshold, the mobile will switch to this base station.

The neighbor list message indicates the pilot offset index and configuration structure for the base stations of neighboring cells. The configuration structure information indicates whether the neighboring base station is configured the same as the current base station, and/or any differences in that configuration (e.g., location of paging channels). The channel list message indicates the number of paging channels the base station is using. The access parameters message informs the mobiles of the communication format that the mobile should use in accessing the base station.

Besides the information discussed above, the system parameters message, the neighbor list message, and the channel list message include the same common message sequence number; also referred to as the configuration sequence message (CSM) number. The CSM number changes if any parameter in the system parameters message, the neighbor list message, or the channel list message changes. By comparing the CSM number of overhead message information a mobile currently stores with the CSM number in a detected overhead message, a mobile decides whether to update the stored overhead message parameters from the system parameters message, the neighbor list message, and the channel list message. Similarly, the access parameters message further includes an access message sequence (AMS) number. The AMS number changes if any parameter in the access parameters message changes. By comparing the AMS number of overhead message information a mobile currently stores with the AMS number in a detected overhead message, a mobile decides whether to update the stored overhead message parameters of the access parameters message.

In addition to the overhead messages and mobile specific message discussed above, the base station also generates a general page message. This message indicates, among other things, the current CSM and AMS numbers. A mobile specific slot 12 can include only mobile specific messages, only general page messages, or both mobile specific messages and general page messages.

When a mobile is first turned on, the mobile performs an initialization process such as shown in FIG. 2. First, in step S10, the mobile detects the strongest pilot channel, and then camps onto the associated sync channel in step S15. Using the information on the sync channel, the mobile camps onto the primary paging channel (generally the paging channel having the lowest Walsh code) in step S20, and obtains and stores the parameters in the channel list message from the overhead messages in step S25. As discussed above, the channel list message includes information on the number of paging channels employed by the base station.

Then, in step S30, the mobile determines from the parameters in the channel list message if the base station transmits more than one paging channel. If so, the mobile determines in step S35 the particular paging channel to monitor. This is accomplished using a well-known hashing algorithm which computes the paging channel number based on the number of possible paging channels and the identification number of the mobile. The mobile identification number and hashing also indicates which slot of the computed paging channel the mobile should monitor for mobile specific messages. More than one mobile can map to the same mobile specific slot of a paging channel. Mobiles differentiate between the messages destined for them and destined for other mobiles by recognizing their identification number in the mobile specific message.

Next, in step S40, the mobile hashes onto the paging channel determined in step S35, and obtains the information in the overhead messages (hereinafter collectively referred to as "the overhead parameters") from this paging channel in step S45. The mobile then continuously determines whether to update the stored overhead parameters in step S50 based on the CSM and AMS numbers in the manner discussed above.

In step S30, if the mobile determines that only one paging channel exists, then the mobile obtains the overhead parameters in the overhead messages in step S55 from the primary paging channel, and determines the mobile specific slot to monitor in step S60 in the same manner discussed above with respect to step S35.

After the initialization process is complete, the mobile may enter an idle state wherein the mobile is not engaged in communication with the base station. During the idle state, the mobile may monitor particular slots such as its mobile specific slot, and sleep the rest of the time to save battery life. This mode of operation is referred to as the slotted mode. The mobile may also operate in an unslotted mode wherein the mobile monitors all slots. The unslotted mode is entered when the mobile operates to access the system.

If at any time the mobile loses the pilot channel, the initialization process must be repeated. The initialization process, beginning with step S15, is also repeated anytime the mobile switches base stations, referred to as an idle hand-off. The initialization process must be completed before a call can be made or received by the mobile. Additionally, before a call can be made, the mobile has to confirm its stored overhead parameters are current.

It takes a mobile on average about 600 ms to determine whether an update of the overhead parameters is required, and then up to another 1.28 seconds to actually update these overhead parameters, if necessary. Unfortunately, during this time, the pilot channel can be lost, or the switch to a new pilot determined; such that initialization must be repeated. As a result, the user's desired operation, like placing a call, is delayed. These time periods can be reduced by increasing the number of overhead message slots in a paging channel at the expense of reducing the number of mobile specific message slots, but the mobile specific message slots cannot be completely eliminated. Furthermore, reducing the number of mobile specific message slots degrades system performance.

It has been determined that the shorter the initialization and/or overhead parameter update time, the greater the likelihood that, for example, a call will succeed.

SUMMARY OF THE INVENTION

The wireless CDMA system according to the present invention uses one of the forward control channels as a configuration channel. The plurality of message slots in this configuration channel only include overhead messages. The other non-configuration forward control channels traditionally used as paging channels, by contrast, do not include slots with overhead messages. Furthermore, besides the offset indices for neighboring base stations, the neighbor list message in the overhead messages indicates whether a neighboring base station supports a configuration channel and the location of a supported configuration channel. By using the configuration channel, a mobile significantly reduces the initialization and overhead parameters update time compared to mobiles in a conventional wireless CDMA system.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein.

DETAILED DESCRIPTION OF THE PREFERRED EMBODIMENTS

Figure 3:
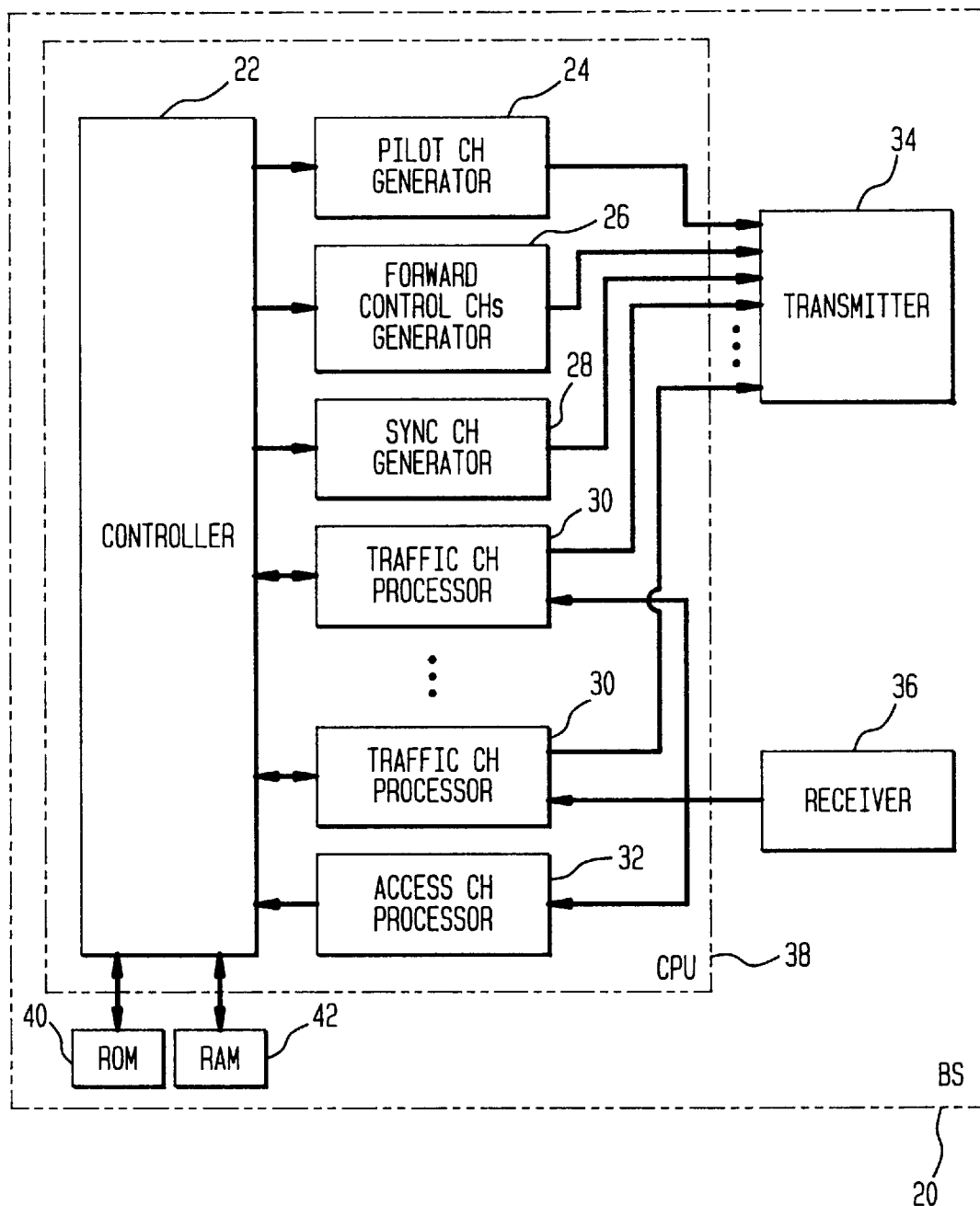
FIG. 3 illustrates a conceptual block diagram of an embodiment of a base station in a wireless CDMA system according to the present invention.

FIG. 3 illustrates a conceptual block diagram of an embodiment of a base station in a wireless CDMA system according to the present invention. As shown in FIG. 3, the base station 20 includes a central processing unit (CPU) 38 connected to a transmitter 34, a receiver 36, a read-only memory (ROM) 40 and a random access memory (RAM) 42. The ROM 40 stores operational programming for the CPU 38, and the RAM 42 stores intermediate and operational data for the CPU 40.

The CPU 40 includes a controller 22 connected to a pilot channel generator 24, a forward control channels generator 26, a sync channel generator 28, a plurality of traffic channel processors 30, and an access channel processor 32. The pilot channel generator 24, the forward control channels generator 26, the sync channel generator 28, and the traffic channel processors 30 are connected to the transmitter 34, while the traffic channels processors 30 and the access channel processor 32 are connected to the receiver 36. While not shown in FIG. 3, the base station 20 also provides for communication with a public switch telephone network.

Under the control of the controller 22, the pilot channel generator 24 generates a pilot channel, the traffic channel processors 30 handle communication over the traffic channels, and the access channel processor 32 handles receipt of requests over the access channel in the conventional manner. The controller 22, however, controls the forward control channels generator 26 to generate the forward control channels in a different manner than that previously discussed.

Figure 1:
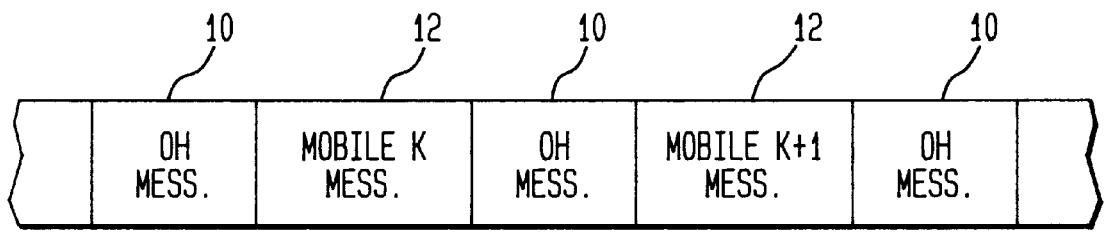
FIG. 1 illustrates the format of a traditional paging channel.
Figure 5:
FIG. 5 illustrates the format of one of the forward control channels, referred to as the configuration channel, generated by the base station according to the present invention.
Figure 6:
FIG. 6 illustrates the format of other forward control channels, other than the configuration channel, generated by the base station according to the present invention.

As shown in FIG. 5, the forward control channels generator 26 generates a forward control channel, traditionally serving as a paging channel, wherein each slot includes the overhead messages; hereinafter, this forward control channel will be referred to as the configuration channel. The other forward control channels generated by the forward control channels generator 26, which traditionally served as paging channels, have the format shown in FIG. 6. The forward control channels having the format shown in FIG. 6 will be referred to, somewhat untraditionally, as paging channels for the remainder of the description of the present invention. As shown in FIG. 6, each slot in the paging channels is a mobile specific message. In an alternative embodiment, the paging channels have the same format as the traditional paging channels shown in FIG. 1 and include both mobile specific message and overhead message slots to allow for compatibility with mobiles which do not support monitoring the configuration channel. Accordingly, the term paging channels as used in the remainder of this description and the claims should be construed as covering at least both the formats shown in FIGS. 1 and 6 unless stated to the contrary.

In one embodiment, the configuration channel is predetermined and fixed regardless of the number of paging channels. However, in an alternative embodiment, the configuration channel is given the Walsh code of the highest existing paging channel plus one. For instance, if the base station 20 requires three paging channels having Walsh code 1–3 to handle mobile specific messages, the Walsh code of the configuration channel is set to 4. This alternative embodiment also provides for compatibility with mobiles which do not support a configuration channel because the forward control channels generator 26 still generates a channel list message indicating the number of paging channels.

The sync channel generator 28 generates a sync channel as described with respect to the related art, except that the controller 22 controls the sync channel generator 28 to also include information indicating whether a configuration channel exists and the location of the configuration channel. For example, in a conventional wireless CDMA system, Walsh codes 1–7 define the location of seven possible paging channels. The sync channel generator 28 supplies the Walsh code of the configuration channel.

In generating the configuration channel, the forward control channels generator 26, under the control of the controller 22, adds information to the neighbor list message in the overhead messages. In addition to supplying the pilot offset indices and configuration structure for the neighboring base stations, the neighbor list message indicates, for each neighboring base station, whether the base station supports a configuration channel and the location of the configuration channel.

Except for the differences noted above, the base station 20 operates in the conventional manner to control communication between mobiles.

Figure 4:
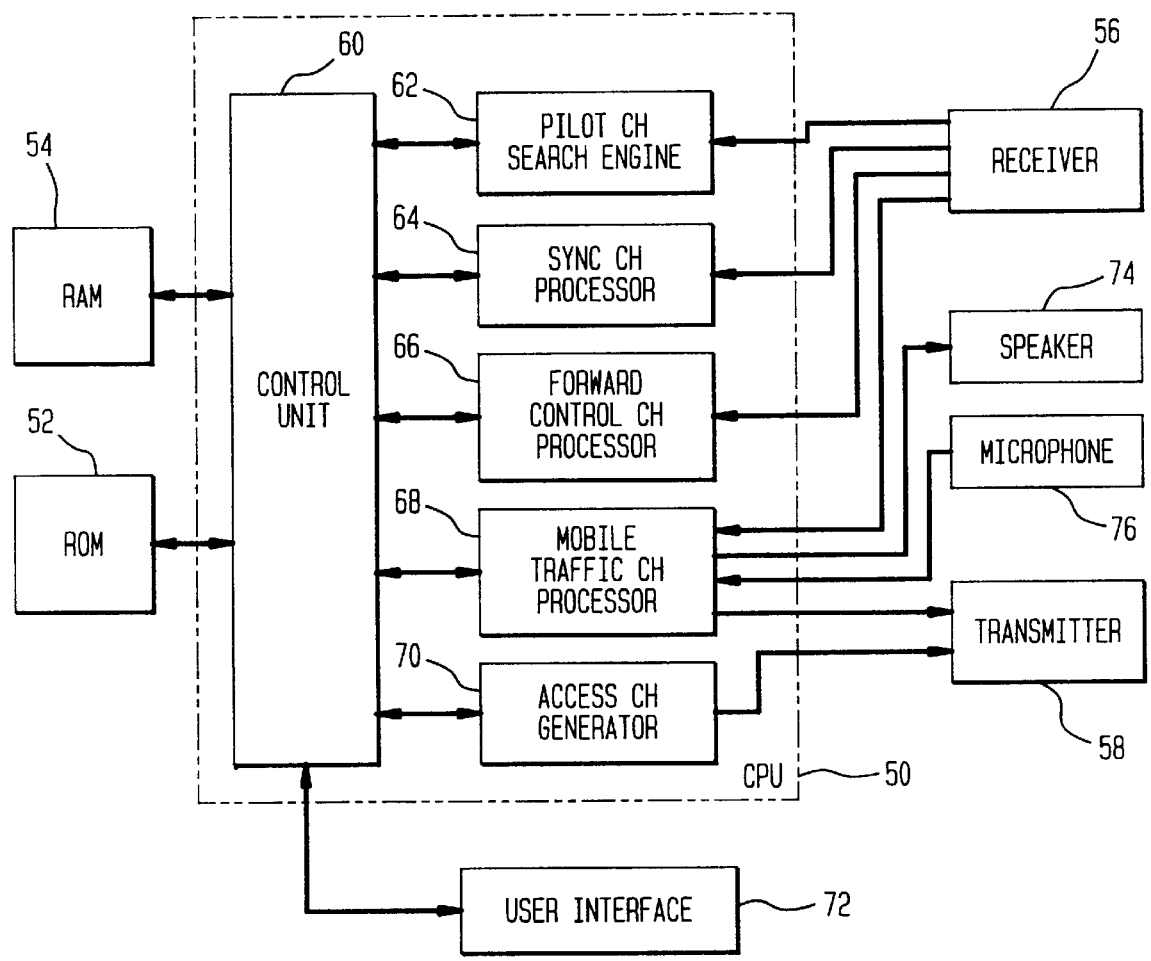
FIG. 4 illustrates a conceptual block diagram of an embodiment of a mobile in the wireless CDMA system according to the present invention.

FIG. 4 illustrates a conceptual block diagram of an embodiment of a mobile in the wireless CDMA system according to the present invention. As shown in FIG. 4, the mobile includes a central processing unit (CPU) 50 connected to a read-only memory (ROM) 52, a random access memory (RAM) 54, a receiver 56, a transmitter 58, a user interface 72, a speaker 74 and a microphone 76. The ROM 52 stores the operational programming of the CPU 50, and the RAM 54 stores intermediate and operational data for the CPU 50.

The CPU 50 includes a control unit 60 connected to the ROM 52, the RAM 54, a pilot channel search engine 62, a sync channel processor 64, a forward control channel processor 66, a mobile traffic channel processor 68, and an access channel generator 70. The pilot channel search engine 62, the sync channel processor 64, the forward control channel processor 66, and the mobile traffic channel processor 68 are connected to the receiver 56. The mobile traffic channel processor 68 and the access channel generator 70 are connected to the transmitter 58. The mobile traffic channel processor 68 is also connected to a speaker 74 and a microphone 76.

Under the control of the control unit 60, the pilot channel search engine 62 detects the pilot channels received by the receiver 56, and determines the strength of each pilot channel. The control unit 60 determines which of the pilot channels is the strongest, and selects a base station associated with that pilot channel for servicing the mobile's communication needs.

The control unit 60 informs the sync channel processor 64 of the selected pilot channel, and the sync channel processor 64 camps onto the sync channel received by the receiver 56 and associated with the selected pilot channel. The sync channel processor 64 processes the information in the sync channel, and provides the sync channel information to the control unit 60. The control unit 60 stores this information in the RAM 54.

Based on the information in the sync channel, the control unit 60 instructs the forward control channel processor 66 on the forward control channels received by the receiver 56 to process. The forward control channel processor 66 camps or hashes onto the forward control channel or channels instructed by the control unit 60, detects the overhead messages and the mobile's mobile specific message, and outputs the information in the overhead messages and mobile specific message to the control unit 60. The information in the overhead messages and the mobile specific message is stored by the control unit 60 in the RAM 54.

The control unit 60 receives operation instructions from the user via the user interface 72. If a user wants to place a call, this instruction is entered via the user interface 72. When a call is to be placed, the mobile requires a traffic channel over which to place the call. Requests, such as for a traffic channel, to the base station are supplied by the control unit 60 to the access channel generator 70. The access channel generator 70 transmits these requests via the transmitter 58 on the access channel of the base station. Responses to requests, including the traffic channel assigned by the base station, form part of the mobile specific message sent by the base station on the paging channel.

Accordingly, the control unit 60 monitors the mobile specific message detected by the forwarding control channel processor 66 for the assigned traffic channel. Once the assigned traffic channel is received, the control unit 60 instructs the mobile traffic processor 68 to handle audio and non-audio communication over the assigned traffic channel.

The mobile traffic channel processor 68 processes audio data received by the receiver 56 on the assigned traffic channel, and outputs audio signals to the speaker 74. The mobile traffic channel processor 68 converts audio signals received from the microphone 76 into audio data, and transmits the audio data on the assigned traffic channel via the transmitter 58. Non-audio data, such as pages (e.g., text for display on a display device of the user interface 72), received by the mobile traffic channel processor 68 on the assigned traffic channel are processed and output to the control unit 60. Depending on the non-audio data, the control unit 60 may output the processed non-audio data to the user interface 72.

Next, the initialization process performed by the mobile according to the present invention will be described with reference to FIG. 7. The control unit 60 in step S100 selects the strongest pilot signal from among those detected by the pilot channel search engine 62. The control unit 60 then instructs the sync channel processor 64 to camp onto the sync channel associated with the selected pilot signal in step S110. As part of this step, the sync channel processor 64 sends the obtained sync channel information to the control unit 60. The control unit 60 stores the sync channel information in the RAM 54.

Figure 2:
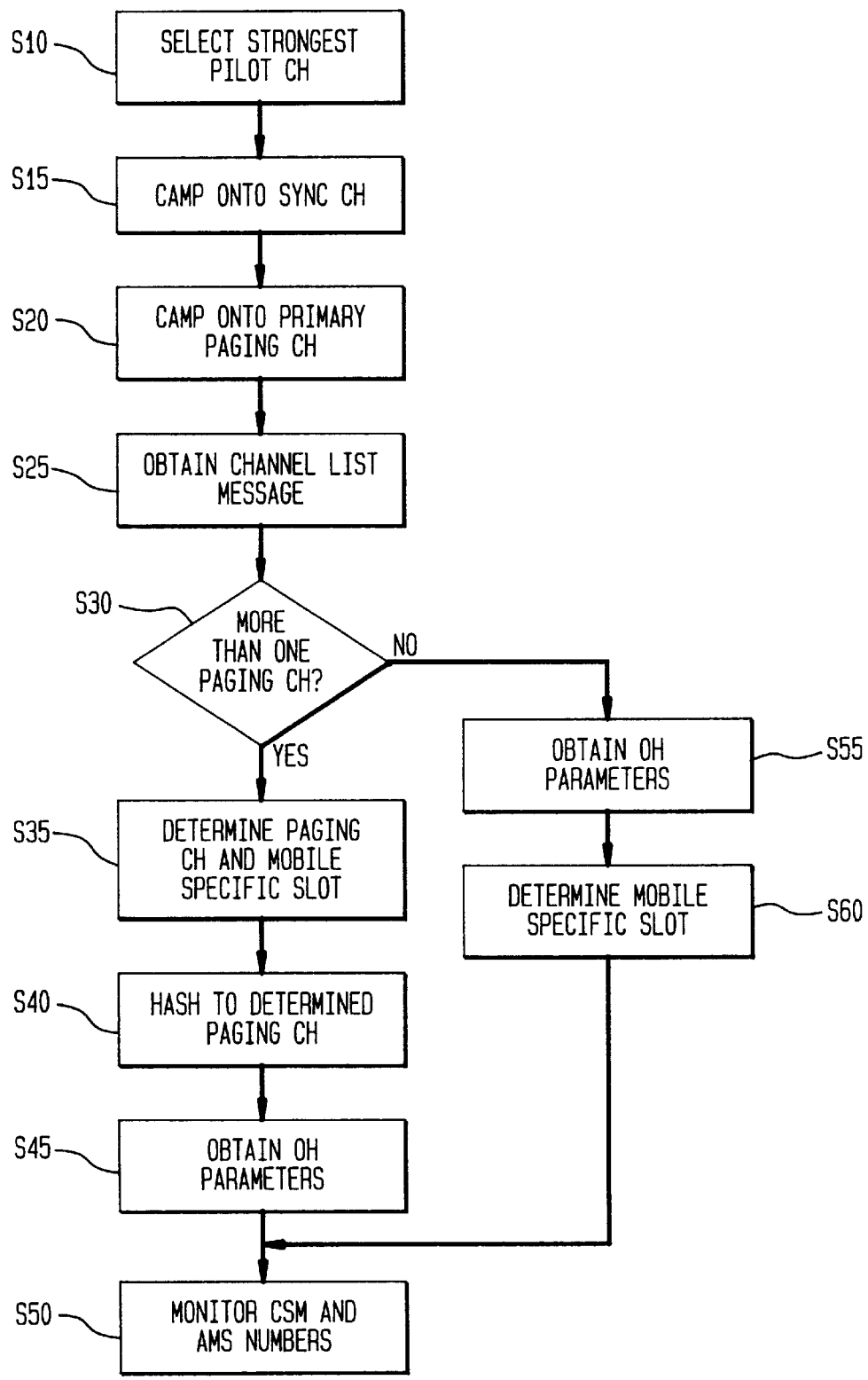
FIG. 2 illustrates the initialization process performed by a conventional mobile in a conventional wireless CDMA system.

From the sync channel information, the control unit 60 determines in step S120 whether the base station supports a configuration channel. If a configuration channel is not supported, the mobile completes the initialization process by going to step S20 of FIG. 2. However, if a configuration channel is supported, the control unit 60 determines the location of the configuration channel from among the forward control channels based on the sync channel information, and instructs the forward control channel processor 66 to camp onto the configuration channel in step S130. In step S140, the forward control channel processor 66, as instructed by the control unit 60, obtains the overhead parameters in the overhead messages, and outputs the overhead parameters to the control unit 60. The control unit 60 stores the overhead parameters in the RAM 54.

Next, in step S150, the control unit 60 determines the paging channel and mobile specific message slot to monitor based on the stored overhead parameters from the channel list message and the identification number for the mobile, and hashes to the determined paging channel. The control unit 60 then begins a monitor operation illustrated in FIG. 9.

Figure 9:
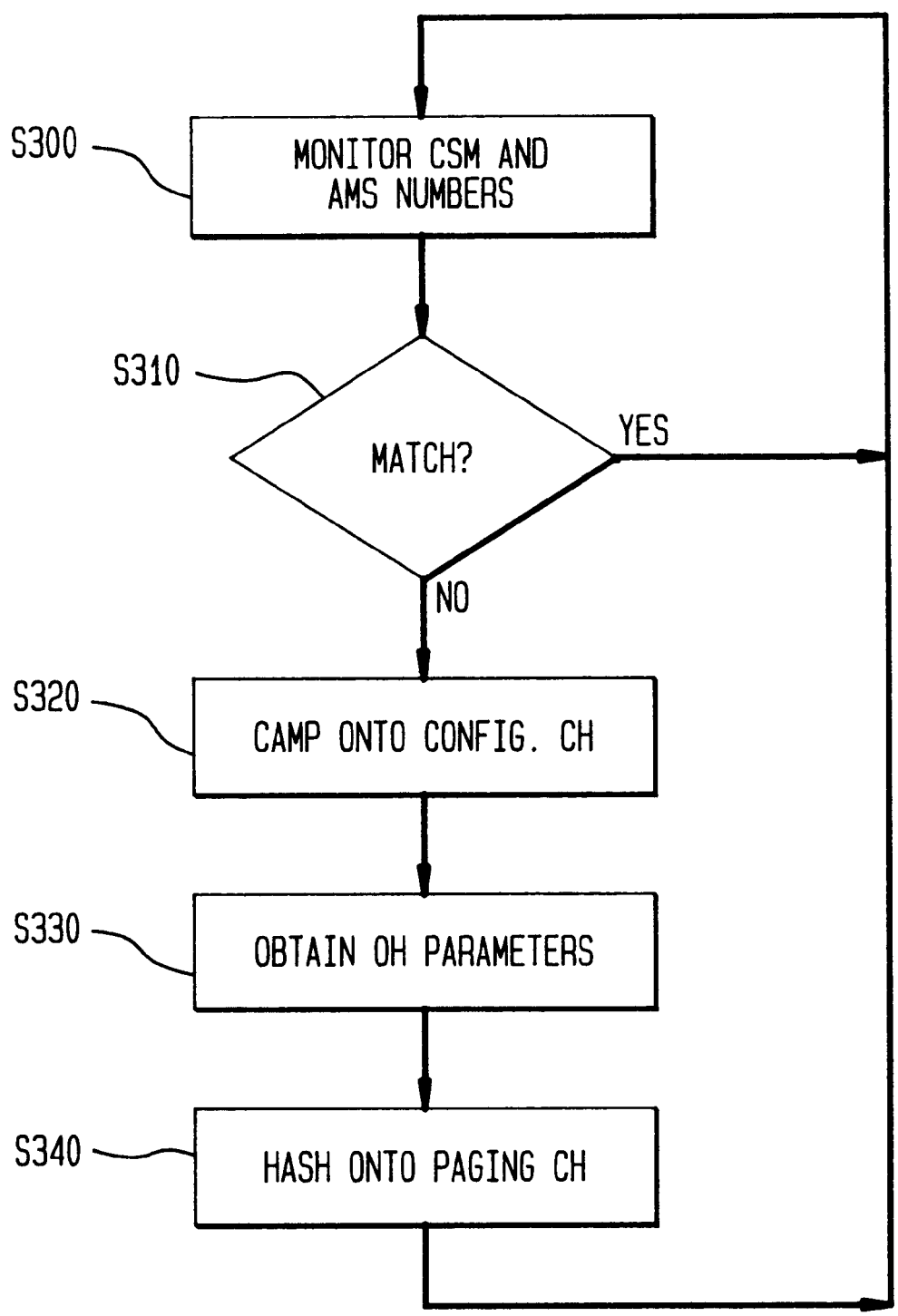
FIG. 9 illustrates a flow chart of the monitor operation performed by the mobile once the initialization process has been completed.

Specifically, FIG. 9 illustrates a flow chart of the monitor operation performed by the mobile once the initialization process has been completed. As shown in FIG. 9, in step S300 the control unit 60 monitors the CSM and ASM numbers detected by the forward control channel processor 66 on the paging channel being monitored. Namely, the control unit 60 monitors the CSM and ASM numbers in the general page message received by the forward control channel processor 66.

Then, in step S310, the control unit 66 determines whether the CSM and AMS numbers detected in step S300 match the CSM and AMS numbers, respectively, for the overhead parameters stored in the RAM 54. If a match is determined, processing returns to step S300. If one of the detected numbers does not match the stored number, processing proceeds to step S320. Instead of determining whether both numbers match, the control unit 60 can monitor only one of the numbers and determine whether a match exists.

In step S320, the control unit 60 instructs the forward control channel processor 66 to camp onto the configuration channel. In step S330, the forward control channel processor 66, as instructed by the control unit 60, obtains the overhead parameters of the overhead messages corresponding to the one of or both of the CSM and AMS numbers not producing a match, and outputs the obtained overhead parameters to the control unit 60. The control unit 60 stores the obtained overhead parameters in the RAM 54. The control unit 60 then instructs the forward control channels processor 66 to hash onto the paging channel including the mobile specific messages for this mobile in step S340, and processing returns to step S300.

Updating the stored overhead parameters in the wireless CDMA system according to the present invention, wherein the base station makes a configuration channel available, takes less than 0.2 seconds, and determining whether an update is required (i.e., checking CSM and ASM numbers) takes on average about 100 ms. These significant improvements over the conventional wireless CDMA system greatly increase the likelihood that, for example, a call will succeed.

Furthermore, the wireless CDMA system according to the present invention also provides for greatly improved battery life. Mobiles in a wireless CDMA system operate in an unslotted and slotted mode. In the unslotted mode, mobiles monitor all slots in the paging channel. In the slotted mode, the mobile only monitors the mobile specific slot for that mobile and checks to determine whether the overhead parameters should be updated as described above with respect to FIG. 9. For the duration of the other slots, the mobile sleeps (i.e., does not draw power to perform the forgoing monitoring functions). Because updating the overhead parameters and checking on whether to update the overhead parameters takes significantly less time than conventional wireless CDMA systems, less power is required and battery life is extended.

Also, because the overhead messages are not placed on each paging channel, the capacity of the paging channels is greatly increased.

In the event the pilot channel search engine 62 loses the selected pilot channel, the pilot channel search engine 62 will either reacquire the selected pilot channel or acquire a different pilot channel. In either event, the initialization process is repeated. Accordingly, the present invention provides for improved performance when either of these events occurs by significant reducing the initialization period.

Figure 8:
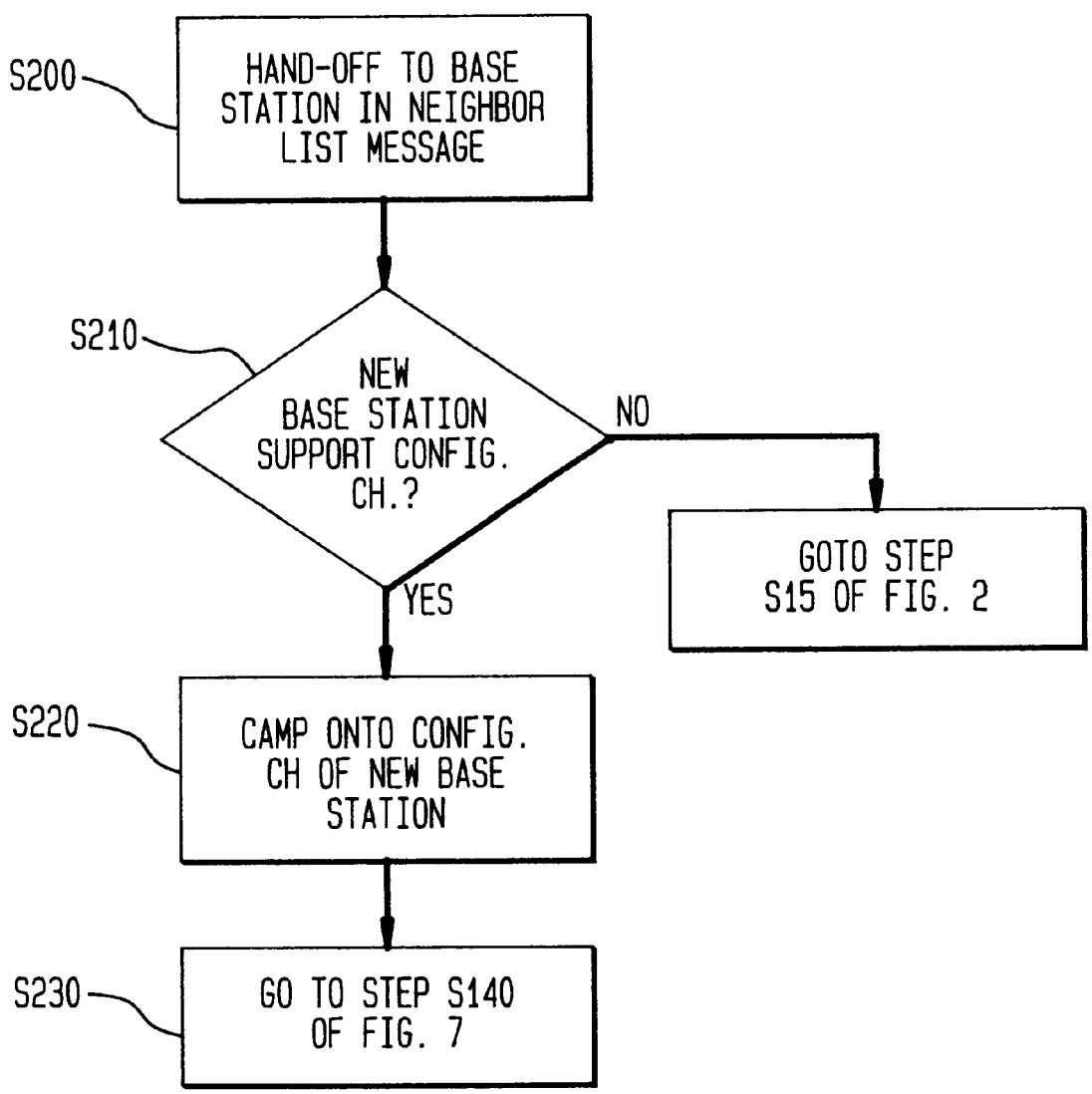
FIG. 8 illustrates the initialization process performed by the mobile according to the present invention after an idle hand-off.

Furthermore, if the mobile performs an idle hand-off, the mobile performs the modified initialization process shown in FIG. 8, which can also greatly reduce the initialization period after a hand-off. As discussed above, the neighbor list message in the overhead message not only includes the pilot offset indices and configuration structure of neighboring base stations, but also indicates whether each base station on the list supports a configuration channel and the location of the configuration channel. As shown in FIG. 8, in step S200, the control unit 60 completes an idle hand-off to a new base station listed in the neighbor list message in the conventional manner. Then, with respect to the initialization process, the control unit 60 determines in step S210 if the new base station supports a configuration channel based on the information in the neighbor list message.

If the new base station does not support a configuration channel, then the control unit 60 performs the initialization process described above with respect to FIG. 2 beginning with step S15. But, if the new base station does support a configuration channel, then in step S220, the control unit 60 instructs the forward control channel processor 66 to camp onto the configuration channel specified for the new base station by the overhead parameters from neighbor list message. Unlike the initialization process described with respect to FIG. 7, the control unit 60 does not need to acquire the sync channel information before being able to instruct the forward control channel processor 66 on the location of the configuration channel. Accordingly, the present invention realizes a further reduction in the initialization time when making an idle hand-off to a neighboring base station.

Figure 7:
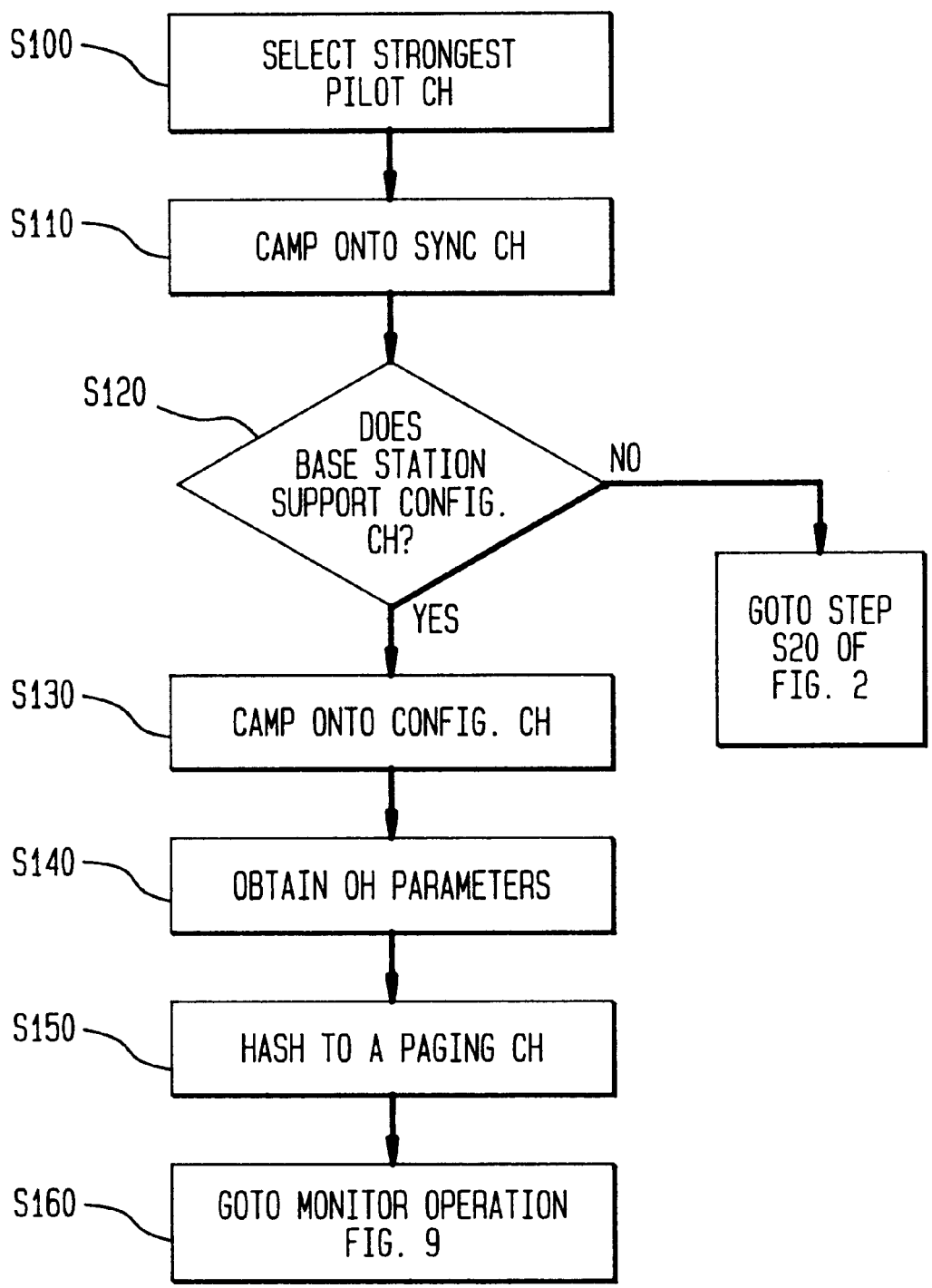
FIG. 7 illustrates the initialization process performed by the mobile according to the present invention.

Then, in step S230, the modified initialization process goes to step S140 of FIG. 7 and completes.

As discussed previously, prior to placing a call, the mobile checks to make sure that the stored overhead parameters are up-to-date. Unlike mobiles in a conventional wireless CDMA system, the mobile according to the present invention does not have to wait for either a general page message in a mobile specific slot or a overhead message slot in the monitored paging channel. Instead, the mobile according to the present invention performs the pre-call process illustrated in FIG. 10.

Figure 10:
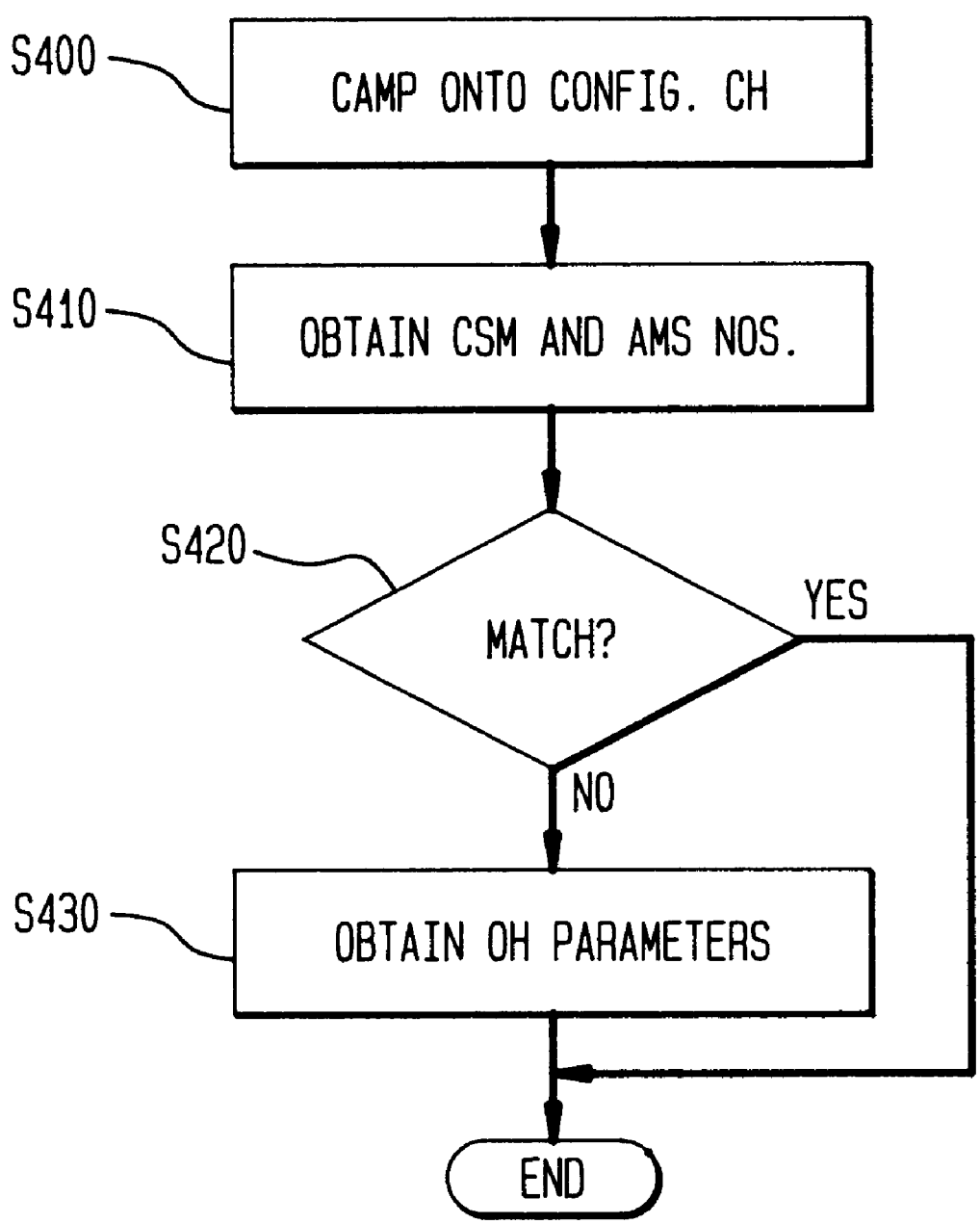
FIG. 10 illustrates a flow chart of the pre-call process performed by a mobile according to the present invention to determine whether to update stored overhead parameters.

FIG. 10 illustrates a flow chart of the pre-call processes performed by a mobile according to the present invention to determine whether to update the stored overhead parameters. As shown in FIG. 10, in step S400, the control unit 60 instructs the forward control channel processor 66 to camp onto the configuration channel, and in step S410 instructs the forward control channel processor 66 to obtain the CSM and AMS numbers from the overhead messages on the configuration channel.

In step S420, the control unit 60 determines whether the CSM and AMS numbers detected in step S410 match the CSM and AMS numbers, respectively, for the overhead parameters stored in the RAM 54. If a match is determined, processing ends. If one of the detected numbers does not match the stored number, processing proceeds to step S430. Instead of determining whether both numbers match, the control unit 60 can monitor only one of the numbers and determine whether a match exists.

In step S430, the control unit 60 obtains the overhead parameters of the overhead messages corresponding to one of or both of the CSM and AMS numbers not producing a match via the forward control channel processor 66, and stores the newly obtained overhead parameters in the RAM 54. The pre-call process then ends.

The invention being thus described, it will be obvious that the same may be varied in many ways. Such variations are not to be regarded as a departure from the spirit and scope of the invention, and all such modifications are intended to be included within the scope of the following claims.

We claim:

1. A method of transmitting forward control channels from a base station in a wireless CDMA system, each forward control channel being assigned a separate orthogonal code, comprising:
   first generating at least one forward control channel having a first plurality of slots, at least one of said first plurality of slots including a mobile specific message;
   second generating a configuration channel as an other forward control channel having a second plurality of slots, said second plurality of only including overhead messages; and
   transmitting said forward control channels including said configuration channel.

2. The method of claim 1, wherein said overhead messages include a neighbor list message, and overhead parameters in said neighbor list message list pilot channel offset indices for base stations of neighboring cells and indicate whether each listed base station transmits a configuration channel and a location of said transmitted configuration channel.

3. The method of claim 1, wherein said first plurality of slots does not include overhead messages.

4. The method of claim 1, wherein said second generating step sets a predetermined Walsh code for said configuration channel.

5. The method of claim 1, wherein said second generating step sets a Walsh code for said configuration channel as a highest Walsh code of said forward control channels generated in said first generating step plus one.

6. A base station of a wireless CDMA system, comprising:
   a pilot channel generator generating a pilot channel having a predetermined offset index;
   a forward control channel generator generating at least a first paging channel having a first plurality of slots and configuration channel having a second plurality of slots, said configuration channel being assigned an orthogonal code different from an orthogonal code assigned to other paging channels, said second plurality of slots only including overhead messages, and at least one of said first plurality of slots including a mobile specific message; and
   a controller controlling operation of said pilot channel generator and said forward control channel generator.

7. The base station of claim 6, wherein said overhead messages include a neighbor list message, and overhead parameters in said neighbor list message list pilot channel offset indices for base stations of neighboring cells and indicates whether each listed base station transmits a configuration channel and a location of said transmitted configuration channel.

8. The base station of claim 6, wherein said first plurality of slots does not include overhead messages.

9. The base station of claim 4, wherein said forward control channel generator sets a predetermined Walsh code for said configuration channel.

10. The base station of claim 6, wherein said forward control channel generator sets a Walsh code for said configuration channel as a highest Walsh code for one of said paging channels plus one.

11. The base station of claim 6, further comprising:
   a sync channel generator generating a sync channel associated with said pilot channel, said sync channel indicating a location of said configuration channel.

12. A method of initializing a mobile in a wireless CDMA system, comprising:
   camping onto a sync channel associated with a received pilot channel, said sync channel including information indicating a location of a configuration channel, said configuration channel having a separate orthogonal code from paging channels;
   camping onto said configuration channel based on said information in said sync channel, said configuration channel including a plurality of slots, said plurality of slots only including overhead messages; and
   obtaining overhead parameters in said overhead messages from said configuration channel.

13. The method of claim 12, wherein
   said overhead messages include a channel list message indicating a number of paging channels associated with said received pilot channel, and further including the steps of,
   determining a paging channel containing a mobile specific message slot for said mobile based on said number of paging channels indicated by said obtained overhead parameters in said channel list message; and
   hashing onto said determined paging channel.

14. A mobile in a wireless CDMA system, comprising:

a pilot channel search engine camping onto a pilot channel;

a sync channel processor camping onto a sync channel associated with said pilot channel, said sync channel including information indicating a location of a configuration channel, said configuration channel having a separate orthogonal code from paging channels;

a forward control channel processor for camping onto a paging channel; and a control unit controlling operation of said pilot channel search engine, said sync channel processor and said forward control channel processor, said control unit determining a location of said configuration channel from said information in said sync channel, and instructing said forward control channel processor to camp onto said configuration channel, said configuration channel including a plurality of slots, said plurality of slot only including overhead messages, and said control unit obtaining overhead parameters in said overhead messages from said configuration channel via said forward control channel processor.

15. The mobile of claim 14, wherein said overhead messages include a channel list message indicating a number of paging channels associated with said pilot channel; and said control unit determines a paging channel containing a mobile specific message slot for said mobile based on said number of paging channels indicated by said obtained overhead parameters in said channel list message, and instructs said forward control channel processor to hash onto said determined paging channel.

16. A method of monitoring overhead messages at a mobile in a wireless CDMA system, comprising:

storing a message number associated with overhead parameters from at least one overhead message in a slot of overhead messages obtained from a configuration channel, slots in said configuration channel only including said overhead messages, said message number in a current slot of said configuration channel differing from said message number in a previous slot of said configuration channel if at least one of said associated overhead parameters in said overhead message in said current slot differs from said associated overhead parameter in said overhead message in said previous slot;

detecting a message number in a slot of a paging channel being monitored by said mobile;

determining if said stored message number matches said detected message number; and obtaining at least said associated overhead parameters from said configuration channel if said stored message number does not match said detected message number.

17. A mobile of a wireless CDMA system, comprising:

a forward control channel processor camped onto a paging channel;

a memory storing a message number associated with overhead parameters from at least one overhead message in a slot of overhead messages obtained from a configuration channel, slots in said configuration channel only including said overhead messages, said message number in a current slot of said configuration channel differing from said message number in a previous slot of said configuration channel if at least one of said associated overhead parameters in said overhead message in said current slot differs from said associated overhead parameter in said overhead message in said previous slot; and a control unit instructing said forward control channel processor to detect a message number in a slot of said paging channel, determining if said detected message number matches said stored message number, and instructing said forward control channel processor to camp onto said configuration channel and obtain said associated overhead parameters from said configuration channel if said detected message number does not match said stored message number.

18. A method of initializing a mobile after an idle hand-off from a first base station to a second base station, comprising:

storing overhead parameters obtained from a configuration channel transmitted by said first base station, slots in said configuration channel only including overhead messages containing said overhead parameters, said overhead messages including a neighbor list message, said overhead parameters in said neighbor list message indicating at least a location of a configuration channel transmitted by said second base station;

camping onto said configuration channel transmitted by said second base station based on said location of said configuration channel transmitted by said second base station in said stored overhead parameters; and obtaining said overhead parameters in said configuration channel transmitted by said second base station.

19. A mobile in a wireless CDMA system, comprising:

a forward control channel processor for camping onto a forward control channel;

a memory storing overhead parameters obtained from a configuration channel transmitted by a first base station, slots in said configuration channel only including overhead messages containing said overhead parameters, said overhead messages including a neighbor list message, said overhead parameters in said neighbor list message indicating at least a location of a configuration channel transmitted by a second base station;

a control unit determining said location of said configuration channel transmitted by said second base station from said stored overhead parameters when said control unit causes an idle hand-off from said first base station to said second base station, and instructing said forward control channel processor to camp onto said configuration channel transmitted by said second base station based on said determined location and obtain said overhead parameters in said configuration channel transmitted by said second base station.

20. A method of monitoring overhead messages at a mobile in a wireless CDMA system, comprising:

storing a message number associated with overhead parameters from at least one overhead message in a slot of overhead messages obtained from a configuration channel, slots in said configuration channel only including said overhead messages, said message number in a current slot of said configuration channel differing from said message number in a previous slot of said configuration channel if at least one of said associated overhead parameters in said overhead message in said current slot differs from said associated overhead parameter in said overhead message in said previous slot;

camping onto said configuration channel;

detecting said message number in a slot of said configuration channel;

determining if said stored message number matches said detected message number; and obtaining said associated overhead parameters from said configuration channel if said stored message number does not match said detected message number.

21. A mobile in a wireless CDMA system, comprising:

a forward control channel processor camped onto a paging channel;

a memory storing a message number associated with overhead parameters from at least one overhead message in a slot of overhead messages obtained from a configuration channel, slots in said configuration channel only including said overhead messages, said message number in a current slot of said configuration channel differing from said message number in a previous slot of said configuration channel if at least one of said associated parameters in said overhead message in said current slot differs from said associated overhead parameter in said overhead message in said previous slot;

a control unit instructing said forward control channel processor to camp onto said configuration channel and detect a message number in a slot of said configuration channel, determining if said detected message number matches said stored message number, and instructing said forward control channel processor to obtain said associated overhead parameters from said configuration channel if said detected message number does not match said stored message number.

22. The method of claim 12, wherein said orthogonal code is a Walsh code.

23. The system of claim 14, wherein said orthogonal code is a Walsh code.

24. The method of claim 16, wherein said configuration channel has a separate orthogonal code from paging channels.

25. The method of claim 26, wherein said orthogonal code is a Walsh code.

26. The system of claim 17, wherein said configuration channel has a separate orthogonal code from forward control channels.

27. The system of claim 26, wherein said orthogonal code is a Walsh code.

28. The method of claim 18, wherein said configuration channel has a separate orthogonal code from forward control channels.

29. The method of claim 28, wherein said orthogonal code is a Walsh code.

30. The system of claim 19, wherein said configuration channel has a separate orthogonal code from forward control channels.

31. The method of claim 30, wherein said orthogonal code is a Walsh code.

32. The method of claim 20, wherein said configuration channel has a separate orthogonal code from forward control channels.

33. The method of claim 32, wherein said orthogonal code is a Walsh code.

34. The system of claim 21, wherein said configuration channel has a separate orthogonal code from paging channels.

35. The system of claim 34, wherein said orthogonal code is a Walsh code.

* * * * *